Patented Jan. 1, 1924.

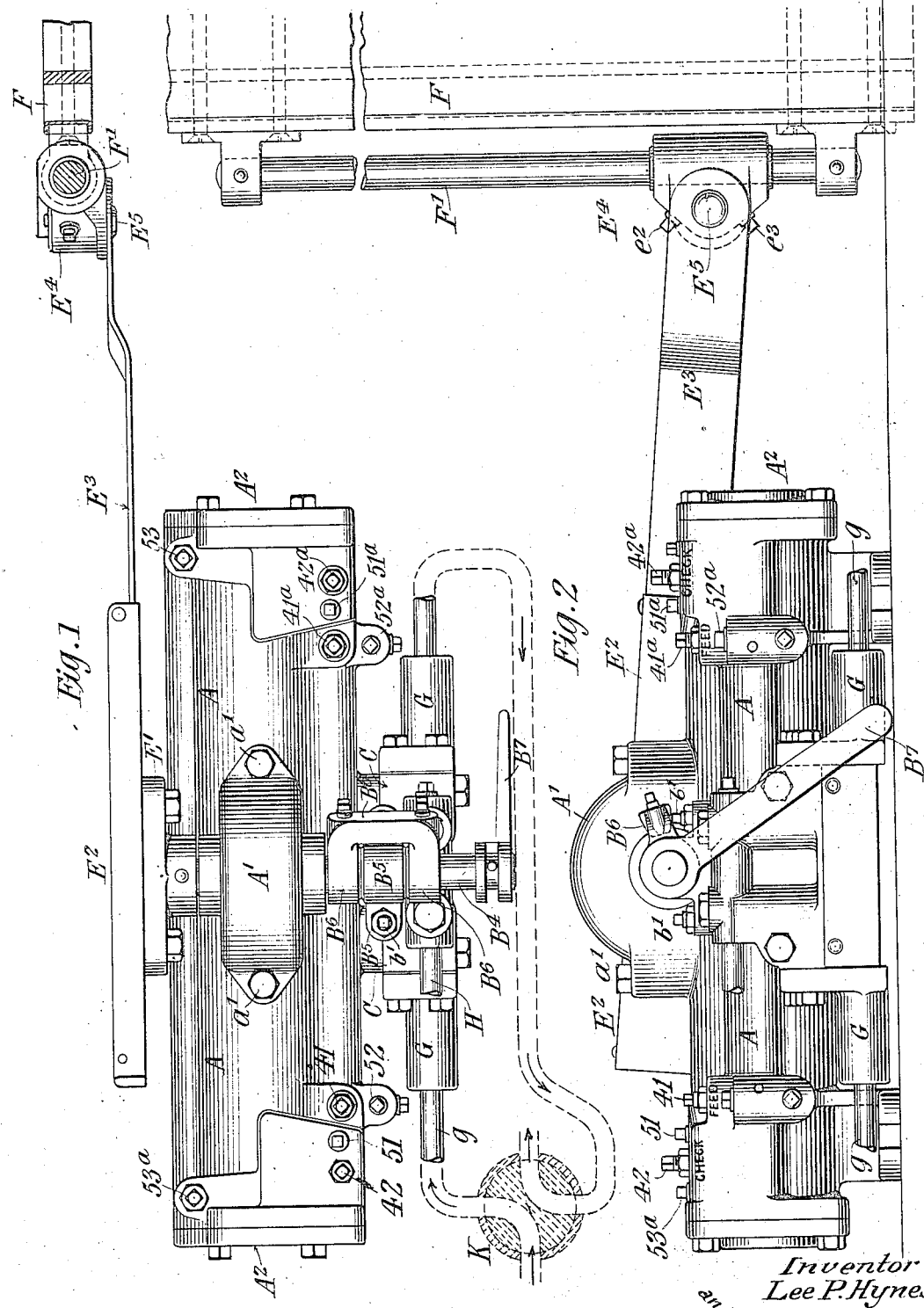

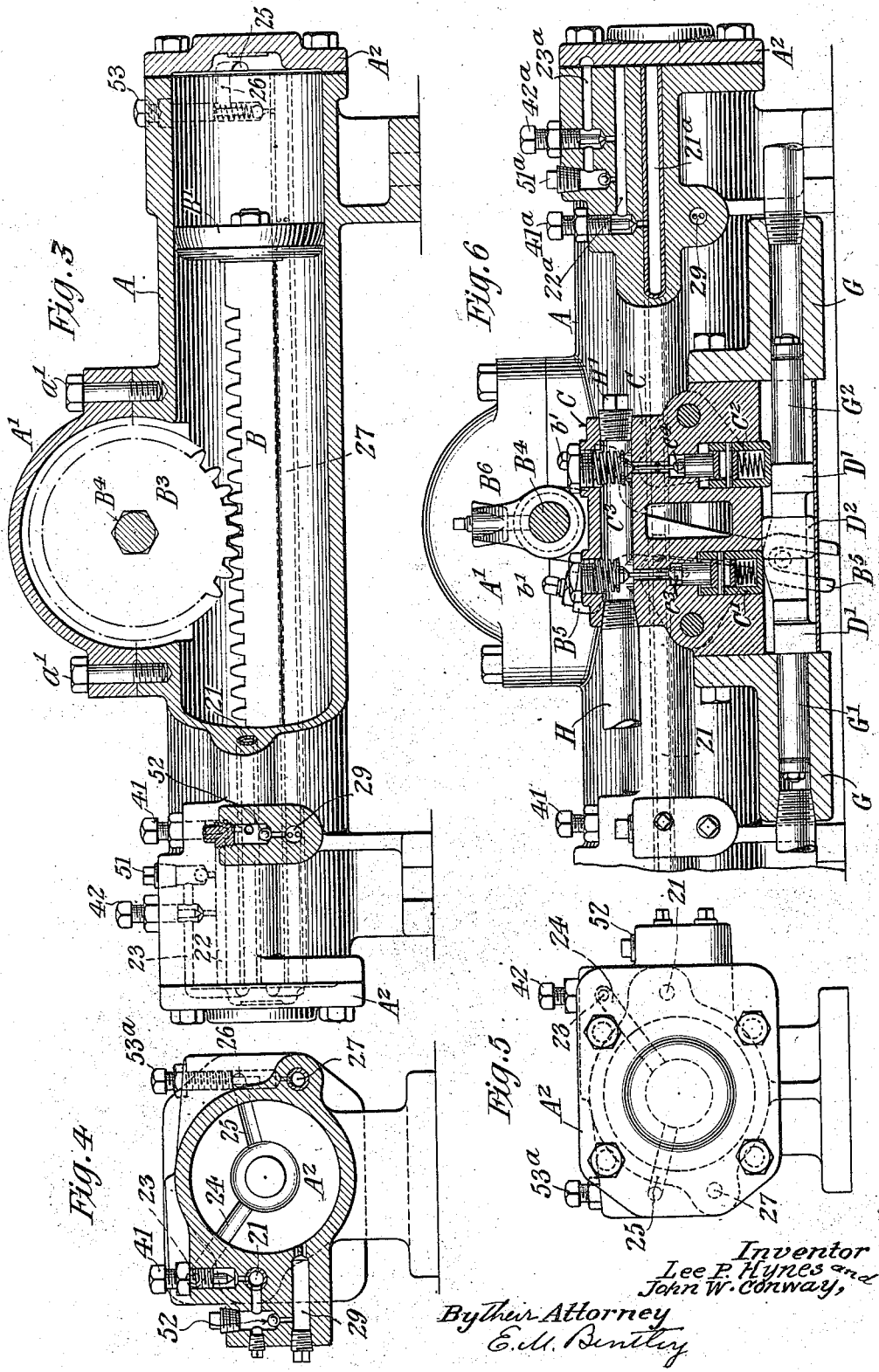

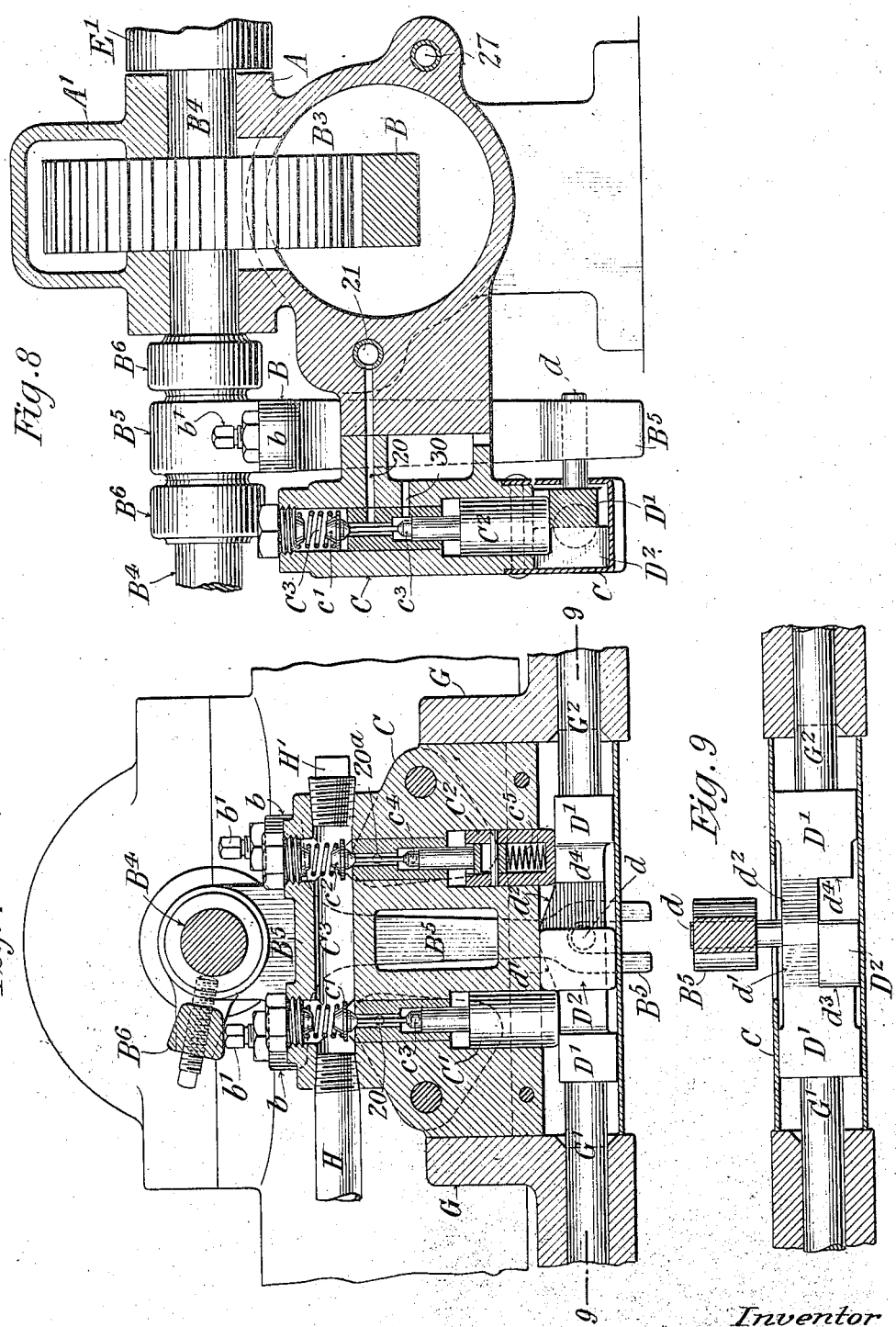

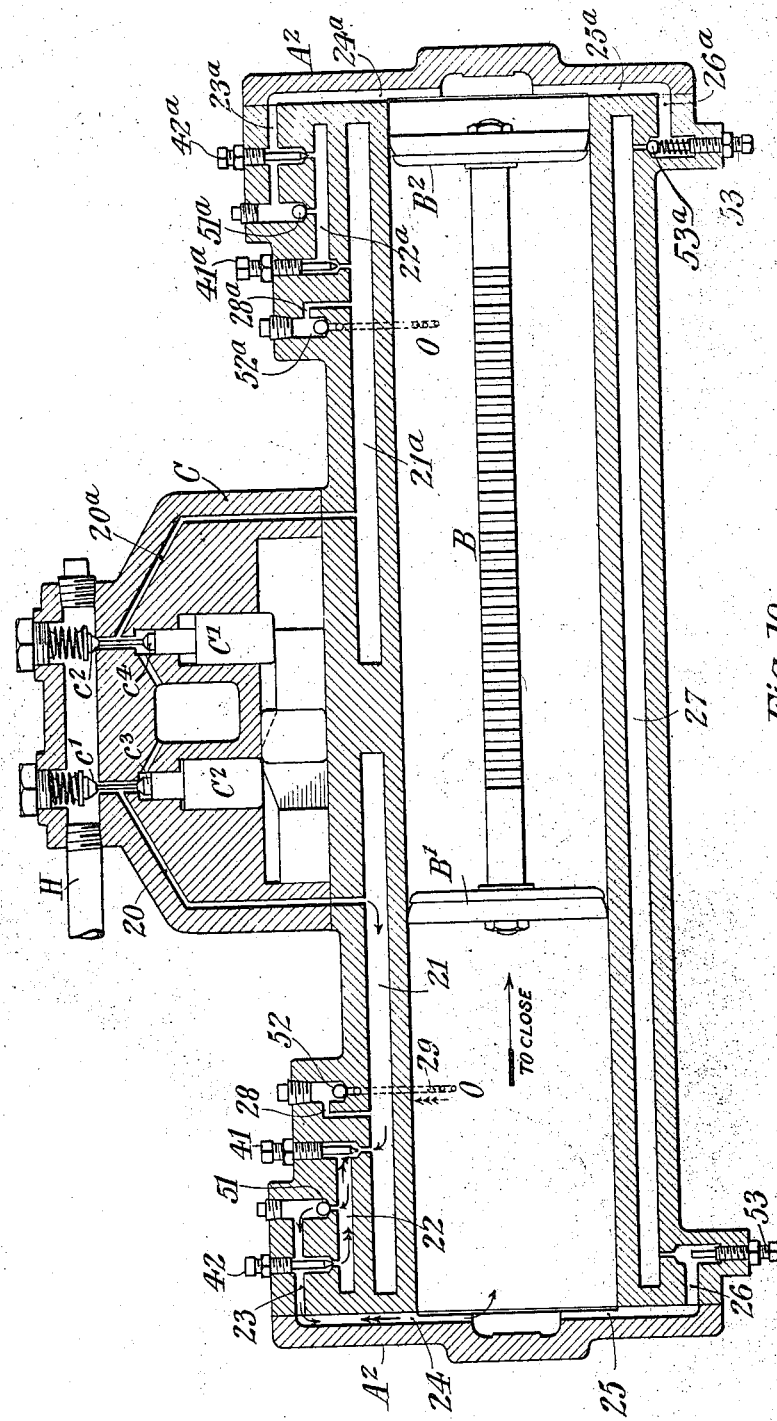

1,479,386

UNITED STATES PATENT OFFICE.

LEE P. HYNES AND JOHN W. CONWAY, OF ALBANY, NEW YORK, ASSIGNORS TO CONSOLIDATED CAR HEATING COMPANY, OF ALBANY, NEW YORK, A CORPORATION OF WEST VIRGINIA.

FLUID-PRESSURE ENGINE.

Application filed October 16, 1918. Serial No. 258,704.

*To all whom it may concern:*

Be it known that we, LEE P. HYNES, a citizen of the United States, residing at Albany, in the county of Albany and State of New York, and JOHN W. CONWAY, a citizen of the United States, residing at Albany, county of Albany, and State of New York, have invented certain new and useful Improvements in Fluid-Pressure Engines, the following being a full, clear, and exact disclosure of the one form of our invention which we at present deem preferable.

For a detailed description of the present form of our invention, reference may be had to the following specification and to the accompanying drawings forming a part thereof, wherein—

Fig. 1 is a plan and

Fig. 2 a side elevation of our device;

Figs. 3 and 4 are sections;

Fig. 5 is an end elevation;

Fig. 6 shows sections through the valves and through the control ducts respectively;

Figs. 7 and 8 are enlarged sections of the valve mechanism;

Fig. 9 is a horizontal section on the line 9—9 of Fig. 7;

Fig. 10 is a diagrammatic section;

Figure 11:
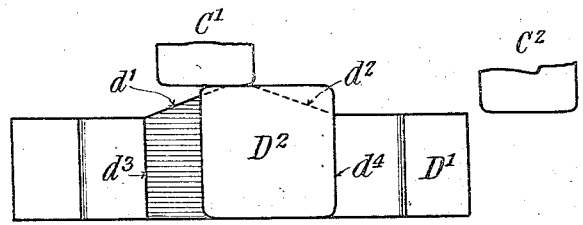
Figs. 11 to 15 show the different positions of the cam-slide that operates the valves.

Our invention relates to a fluid-pressure engine of the type frequently employed in situations where the work is performed by single strokes, as, for instance, in the operation of a door, window or gate, either in closing or opening. An engine of this type we designate herein by the expression strokework engine. We have shown our invention applied to an engine of this type heretofore invented by John W. Conway. In the Conway engine a single, double-acting cylinder is employed, each end of the cylinder serving alternately for power-pressure and for checked-exhaust pressure, and provided with independent adjustment for the power-pressure and the checking-pressure respectively whereby the engine can be set for different rates of travel for its respective in and out strokes. A given adjustment of the power at one end can be accompanied by a corresponding adjustment of the checking at the opposite end, a more rapid travel requiring a stronger check, in order that the high rate of travel may be maintained over the maximum range and checked within the minimum range. In crowded urban railways the capacity for thus speeding up the opening of the car doors is of practical importance in expediting traffic, particularly when the door-closing can be effected at a somewhat slower speed to insure safety. Moreover, this separate adjustment minimizes the effect of temperature changes which tend to alter the rate of travel. In engines of this description we have made a material improvement by grouping most of the several control ducts, needle-valves, and check valves in the walls of the cylinder, while the cylinder is open at both ends for ease in manufacture, and closed by end plates which may be readily applied without interfering with the piping. We also prefer to have those ducts through which the operating pressure enters the cylinder formed by grooves in the said end-plates, which grooves are covered one one side by the enlarged end of the cylinder to form ducts communicating with those in the said enlarged cylinder end, when the end-plates are applied thereto.

We have provided certain other improvements, one of which is an arrangement whereby the same parts may be used without change for either a right-hand or a left-hand door, while another provides for ready separation and removal of the main shaft, gear wheel and door lever from the remainder of the structure. Other features of improvement will be hereinafter pointed out and claimed.

Referring to Fig. 1 of the drawing, A represents the cylinder which is formed as a single casting bored through from end to end with removable end-plates $A^2$, $A^2$, which close the opposite ends of the bore. The internal arrangement is shown in Figs. 3 and 10. Within the bore are two pistons $B^1$ and $B^2$ joined by a rack-rod B, the teeth of which engage the teeth of a gear wheel $B^3$ on the transverse shaft $B^4$. The shaft $B^4$ rests on half-bearings formed on the upper side of cylinder-casting A, the upper halves of the bearings being formed in a removable casting or cap $A^1$, which also houses the top half of gear wheel $B^3$. By simply lifting off the housing $A^1$, which requires only the removal of the two screws $a^1$, $a^1$, the said shaft $B^4$, together with the parts connected to that shaft, can be lifted out from above. The parts so connected to the shaft $B^4$ include the gear-wheel $B^3$ and, on one side of said gear-wheel, the bracket $E^1$ attached to the door-lever, which in this case includes the sheath $E^2$ and the lever bar $E^3$ that slides in said sheath. On the other side of the gear wheel $B^3$, the shaft carries the slide-operating fork $B^5$ and the valve-operating yoke $B^6$, both of which are separable from the parts beneath so that the shaft $B^4$, together with said fork and yoke, can be lifted out as aforesaid. Then, by removing one of the end-plates $A^2$, the pistons and their connecting rack-bar B can be drawn out of the cylinder. Thus the engine can be disassembled in a most simple way.

Figure 12:
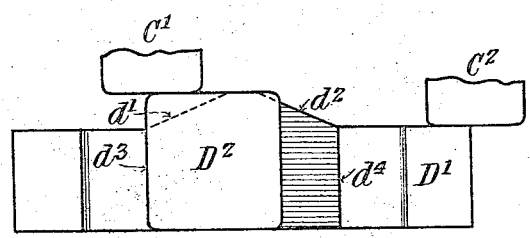
Figure 13:
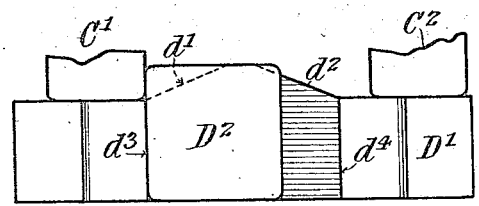
Figure 14:
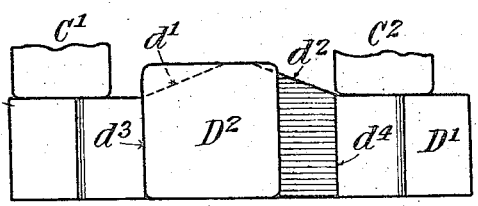
Figure 15:
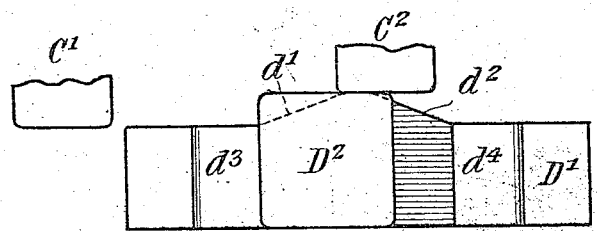

The automatic valves are contained in a separate casting C which is provided on the side adjacent to the cylinder with a flat face adapted to seat against a corresponding face on the cylinder casting A, a tight joint being maintained in any well-known manner. The ducts in the valve casting terminate in openings on its aforesaid seating face which align with corresponding duct-terminals in the seating face of the cylinder, so that when the valve casting is screwed home against the cylinder the communication between the ducts in the two castings is provided for. Plan and side views of the valve casting C are shown in Figs. 1 and 2 respectively, while a vertical section through the valves in said casting is shown in Figs. 6 and, on a larger scale, in 7. In the upper part of the valve casting is a horizontal passageway or chamber $C^3$ which is closed at its right-hand end by a plug $H^1$ and at its opposite end receives the supply pipe H. Thus in chamber $C^3$ there is at all times a maintained pressure. On the floor of the said chamber $C^3$ are two openings or ports forming the seats for the two conical admission valves $c^1$ and $c^2$ respectively which are normally pressed downward against the said seats by springs bearing down on them from above as appears in Figs. 6, 7 and 8. The ports controlled by the said admission valves lead downward to corresponding ports controlled by the exhaust valves $c^3$ and $c^4$ respectively. These exhaust ports are closed by the lifting of the valve $c^3$ or $c^4$ which is concurrent with the opening of the admission valve $c^1$ or $c^2$, since a stem connects the valve $c^1$ with valve $c^3$, and a similar stem connects valve $c^2$ with valve $c^4$. In the passages traversed by each stem are ports 20, $20^a$ which, as appears in Fig. 8, connect respectively with ducts 21, $21^a$ in the cylinder casting. Each of the ducts 21, $21^a$ communicates with one end of the cylinder which therefore receives pressure from the chamber $C^3$ aforesaid whenever the corresponding admission valve $c^1$ or $c^2$ is lifted and opened, or, on the other hand, is connected to the exhaust whenever the corresponding exhaust valve $c^3$ or $c^4$ is opened by being forced down. Of course the aforesaid connections are alternative, the opening of an admission valve on one side being accompanied by a closure of the corresponding exhaust valve on the same side and vice-versa. The space into which each exhaust port opens is connected to atmosphere by the duct 30, which is shown in Fig. 8. To raise and lower the valves there are provided two vertically-moving plungers $C^1$ and $C^2$ which are hollow and contain each a helical spring $c^5$ (see Fig. 7) by which each plunger exerts a yielding pressure on the stem of the corresponding pair of valves. Each plunger when forced upward closes the exhaust and opens the admission valve of the pair of valves which that plunger controls. When a plunger is allowed to drop down, the spring above its corresponding admission valve acts downwardly to close the admission and open the exhaust valve. To operate the plungers $C^1$, $C^2$ and their valves, we provide a horizontally sliding cam $D^1$ (see Figs. 6, 7, 9) which has a cam surface $d^1$ that lifts plunger $C^1$ by moving to the left and a similar cam surface $d^2$ that lifts plunger $C^2$ by moving to the right. When one of the plungers is thus lifted, a further movement of the slide moves a support-dog $D^2$ under the lifted plunger. The dog remains under the plunger and holds it in its lifted position after the slide has begun its reverse travel by virtue of a lost-motion connection between the dog and the slide. That connection allows the slide to make its initial movement to lift the plunger before moving the dog into its supporting position and, conversely, allows the slide to make its reverse movement to withdraw the lifting cam surface before moving the dog back out of its supporting position. The removal of the dog from under the plunger permits the plunger to drop. In Fig. 9 a plan of the cam-slide $D^1$ and the support-dog $D^2$ is shown, the slide being located in a horizontal rectangular guideway formed in the bottom part of the valve-casting C. It is operated back and forth by the pistons $G^1$ and $G^2$ acting alternately or by the pin $d$ which projects from its rear side and is straddled by the fork of lever $B^5$. The circumstances of its operation will be described hereinafter. On the front of the slide is a rectangular recess in which is the support-dog $D^2$ which is nearly square in contour and is engaged alternately by the shoulders $d^3$ and $d^4$ that form the sides of the recess. The cam surfaces $d^1$ and $d^2$ of the slide are formed on its upper surface and taken together are of the same length as the recess that receives the dog. In the neutral position of the slide (shown in Fig. 7) the two plungers $C^1$ and $C^2$ bear on the top surface of the slides one at either side of the cam-surfaces $d^1$, $d^2$. Assuming that the slide moves to the left, in Fig. 7, the cam surface $d^1$ will come under plunger $C^1$ and lift it, the dog $D^2$ standing still until its right-hand edge is hit by the shoulder $d^4$. Then a further movement of the slide will carry with it the dog which thus comes under the plunger $C^1$ which has been previously lifted by the cam. The parts will then be in the relation shown in Fig. 11. The slide, in its retrograde travel to the right, will first move to the position shown in Fig. 12, the dog, however, remaining in its supporting position under plunger $C^1$ till the shoulder $d^3$ comes against the left-hand edge of the dog. Then the slide and dog will move together to the position shown in Fig. 13, and, as the dog moves from under plunger $C^1$, the plunger will drop suddenly, thereby opening the exhaust valve and closing the admission valve which it controls. They can not continue their movement as screws $b^1$ of lever $B^5$ must be adjusted to cut off the air at the end of the stroke of rack B. The movement up to ths point is due to the pressure of $B^5$. Any further movement must come from the operator throwing the slide toward $C^2$.

The advantage of the arrangement just described is that the cut-off action of a valve does not follow the gradual movement of the piston but takes place suddenly and completely whether it occurs automatically at the end of the piston stroke, or manually in case a quick reversal is made during a stroke. The engine-starting action of the valve by cams $d^1$, $d^2$ is also rapid.

It is also possible to start the engine without compelling the motorman to hold his starting lever or push button while the door is moving, and without keeping the air pressure on, or the controlling circuit closed while the door is standing in either its open or closed position. In engines now widely used, a reversal can be effected only at the end of the door travel, not at an intermediate point in its travel, and my device is an improvement in that respect. The slide and dog arrangement I have described is also extremely simple, requiring only two pieces which have large wearing surfaces and no fine adjustments, being also cheap to manufacture. It is also easily disassembled, it being only necessary to remove the bottom shell which forms the guideway for the slide, whereupon the slide, the dog, the valves and plungers will all drop out from the under side.

The cam-slide above described is automatically brought back to its intermediate or neutral position at the end of the engine stroke by means which we shall now explain, it being noted that in the said neutral position both admission valves are closed and both exhaust valves are open, no pressure being maintained on either end of the cylinder; and to restart in either direction, the slide, which has a "stand-pat" action, remaining where it is put, must be moved further than the neutral position by other means than the automatic means aforesaid. On the engine shaft $B^4$, outside of its bearings in the cylinder casting A and the gear cap $A^1, f$ is a U-shaped yoke $B^6$ (see Fig. 1) which is secured to and turns with the shaft, each leg of the U being bored to surround the shaft and locked thereto. Between the two legs of the yoke there is loosely sleeved on the shaft the upper end of the slide operating fork $B^5$. This fork hangs down from the shaft with its lower forked end straddling the pin $d$ that projects from the rear of the slide. The fork also has on either side just below its bearing sleeve a lateral extension $b$ (see Fig. 8) with a set screw $b^1$ projecting upward therefrom in the path of the yoke $B^6$. In its neutral position the fork $B^5$ hangs vertically, the heads of the set screws $b^1$ being on the same level which is at the ends of the arc described by the yoke $B^6$. Thus as the yoke moves to the end of its travel it will, as the fork is not vertical, push one of the set screws $b^1$ and bring the fork back to neutral. For a succeeding reverse stroke of the engine the slide must be moved again to open the admission valve and close the exhaust valve at the appropriate end of the cylinder. For this purpose we provide as the preferable means two small pistons $G^1$ and $G^2$ abutting directly against the ends of the slide. These pistons will be controlled in most cases from some distant point, either pneumatically or electrically, in well known ways. As a matter of illustration we have indicated in Fig. 1 a manual control valve K that will admit pressure to either one of the pistons $G^1$, $G^2$ as may be desired according to the direction in which the valve handle is turned. It should be noted that it requires only a momentary action of the handle of valve K to throw the piston $G^1$ or $G^2$, and the engine will then proceed to make a complete stroke although the handle of valve K is immediately brought back to its intermediate or cut-off position. Moreover, the valve K will still be effective to reverse the engine at any point of the engine stroke. For instance, the engine may have just started to close the door and then may be immediately reversed to reopen the door by an opposite and momentary movement of the valve K. That result is due to the dead or "stand-pat" nature of the valve operation; the cam-slide remains wherever it may be set and dominates the spring which tends to close the admission valve, while the dog locks the valve in its admitting position, until the end of the piston stroke.

We shall next explain the control-duct system in the cylinder itself, which we have illustrated diagrammatically in Fig. 10 and in actual detail in Figs. 1–8. The primary supply duct extends from end to end of the cylinder parallel to and at one side of the middle forming two separate passages marked respectively 21 and 21$^a$ which, as aforesaid, communicate respectively with the two admission valves by ducts 20 and 20$^a$ (Figs. 7 and 8). The pressure flow, shown in the diagram Fig. 10 by single-barbed arrows, proceeds (referring to the left-hand end of Fig. 10) from duct 21 by the adjustable needle-valve 41 to a short duct 22 and thence by ball check-valve 51 to duct 23, from which it passes to the end of the cylinder by duct 24 which is formed by a radial groove in the end plate A$^2$. The wall of the cylinder is made thicker at each end to receive the parallel ducts 22 and 23. The needle-valve 41 is the adjuster of the power pressure and determines the rate of travel of the piston from left to right, independently of its rate of travel from right to left, the latter rate being determined independently by the corresponding needle-valve 41$^a$ at the other end of the cylinder. The exhaust starts from a port O in the side of the cylinder, which is formed by three small holes, and which is covered by the piston B$^1$ as it approaches the end of its leftward stroke. The course of the exhaust from port O is indicated in Fig. 10 by triple-barbed arrows; it goes by the duct 29 to the ball check-valve 52, to duct 28, to duct 21 which is now connected to the atmosphere at valve $c^3$. In this route there is no obstruction and, as heretofore explained, the exhaust valve $c^3$ has been suddenly thrown wide open by the dropping of plunger C$^2$ from the dog D$^2$. That gives a free exhaust which permits the quick start and acceleration of the piston and permits the high rate of piston travel to be maintained as long as possible before being checked. The checking is initiated by the piston passing the port O, which is composed of a number of small openings to avoid cutting of the leather packing of the piston. Port O being passed the exhaust must follow a different course which is indicated in Fig. 10 by double-barbed arrows. It follows back along radial duct 24 to duct 23, to the needle-valve 42, to duct 22, to needle-valve 41 (which although acting as an adjustable restriction for the power current is too large to offer any material resistance to the choked exhaust) and then goes by way of ducts 21 and 20 to the now open exhaust valve $c^3$. In closing this checking does not take place until the door lever is approaching its dead center relation to the door which relation is depended on to lock the door in its closed position. Thus the greater part of the door travel is at high speed and the checking causes no material delay.

There is also a duct 27 extending from end to end of the cylinder on the side opposite the main supply duct 21, 21$^a$. At its ends this duct 27 communicates with short ducts 26 and 26$^a$. At the right this communication is through a ball check-valve 53$^a$ while at the left it is free, the plug 53 being there inserted in the hole through which, in case of a reversal of the relation of the engine to the door, the check-valve 53$^a$ can be inserted. The short ducts 26 and 26$^a$ are connected to the ends of the piston chamber by ducts 25 and 25$^a$ formed as radial grooves in the end plates A$^2$ like the grooves 24 and 24$^a$. The purpose of this arrangement is to relieve such excess pressure as might accumulate in the left-hand end of the cylinder when the closure of the door is prevented by an obstruction. In that case the pressure gradually working through the needle-valve 41 would, if not released, gradually build up until it became as great inside the cylinder as it is in the source of supply. Since, in order to provide for power adjustment by the said needle-valve 41, the engine must be adapted to work normally at a pressure lower than the supply source, it would therefore have an abnormal pressure in the described emergency, if it were not for the relief afforded by duct 27 and the check-valve 53$^a$. The spring of the said check-valve will be adjusted to yield when the pressure exceeds a predetermined maximum and allow the excess to blow over into the opposite end of the cylinder.

In Figs. 1 and 2 the engine is shown applied to a left-hand door—i. e., a door which closes from left to right—and the flat bar E$^3$ of the door-lever is connected by means of a horizontal pin E$^5$ to a slide E$^4$ which travels on the vertical rod F$^1$ attached to the door F. The slide E$^4$ is also a grease box and is provided with two grease-ports $e^2$, $e^3$ at top and bottom so that the latter part can be used with a right-hand door. In order to apply the engine to a right-hand door, it is only necessary to lift out the shaft B$^4$, together with the gear wheel and other appurtenances as heretofore described, and remove the pin E$^5$ that joins the lever arm to the door. Then by sliding the pistons to the opposite end of the cylinder and replacing the shaft with the door lever pointing to the left instead of to the right, the engine will be ready for operating the right-hand door, the relief valve 53$^a$ being also shifted as heretofore explained. This change involves no new or differently shaped parts, but the apparatus remains the same with a mere shift in the relation of those parts. The shaft B⁴ may be provided with a handle B⁷ for use in the event of the door being locked by the dead-centering of the door lever, as shown in Fig. 2, at a time when no pressure is available for working the engine. Then the door may be opened by means of the handle B⁷.

In resetting the engine to change it for right or left hand operation, it should be remembered that the extreme angular position of the radial, load-operating arm will be different for the two conditions. Thus if a door, for example, closes towards the right, the arm will come to a horizontal position when the door is closed, but to some inclined position when the door is opened. Hence to use the engine reversely there must be a resetting of the gear relation between the shaft and the pistons. Moreover, if the arm is not radially straight—i. e., lying in one radial plane, the difficulty is greatly increased. By means of the separability above described it is easy to change the position of the gear wheel on the rack to fit either the right-hand or the left-hand conditions. Furthermore, a readjustment is required in the relation of the shaft to the valves in order that the latter may still be operated at the end of the stroke. For this purpose the yoke B⁶ is made adjustable around the shaft so that it may be set in the desired position to work the valve-actuator B⁵ at the proper point in its arc of travel.

What we claim as new and desire to secure by Letters Patent is:

1. A stroke-work engine comprising a double-acting cylinder, independent adjusters for the pressure-flow and the checking flow at each end of the cylinder, two sets of spring-actuated valves one set for each end of the cylinder, a manually controlled valve-operator acting to lift each set of valves against the force of its springs, and means to automatically release a lifted valve-set at the end of the stroke.

2. A stroke-work engine comprising a double-acting cylinder, provided with chambers at each end, two manually controlled valves for connecting said chambers alternately to exhaust and supply, a check-valve and two flow adjusters between each chamber and the interior of the cylinder, and means for automatically bringing each of said valves to a neutral position for closing the admission and opening the exhaust at the end of the engine stroke.

3. A stroke-work engine, comprising a double-acting cylinder provided at each end with a chamber, a check-valve and an adjuster for both the supply and the checking flow between each chamber and the interior of the cylinder, separate admission and exhaust valves for each end of the cylinder for connecting said chambers to the supply and exhaust alternately, and means for automatically operating each set of valves separately to close the admission and open the exhaust at the end of the corresponding engine stroke.

4. A stroke work engine comprising a double-acting cylinder, two sets of spring-actuated valves therefor, separated pistons therein, a shaft geared to said pistons, a radial load-operating arm on said shaft, a mechanical valve-releasing device actuated by said shaft at each end of its travel, and a manually controlled starter for lifting either set of valves to start the engine after an actuation of said valve-releasing device.

5. A stroke work engine comprising a double-acting cylinder, two sets of spring-actuated valves therefor, separated pistons therein, a shaft geared to said pistons, a radial load-operating arm on said shaft, a mechanical lost-motion valve-releasing device operated by said shaft, and a manually controlled starter for lifting either set of valves in the lost motion space after an actuation of said valve-releasing device.

6. A stroke-work engine comprising a double-acting cylinder, two sets of spring-actuated valves therefor separated pistons therein, a transverse shaft geared to said pistons at a point between them, a radial load-operating arm on said shaft, a valve-releasing device, and a manually-controlled starter acting to set said device for a reverse stroke of the engine.

7. In a double-acting fluid-pressure engine, a spring-actuated valve for each end of the cylinder, a cam for lifting said valves alternately, a locking dog for the valves moving in a recess in said cam, but having lost-motion with respect thereto, and automatic means for unlocking one valve without lifting the other.

8. In a double-acting, fluid-pressure engine, a cylinder, a piston therein, a shaft geared to said piston, a valve-actuator loosely sleeved on said shaft, means for operating said actuator by the shaft as the piston approaches the end of its stroke, a manually-controlled reciprocator for setting said valve to produce a succeeding stroke, and a lock for the valve having a lost-motion relation to said actuator.

9. A double-acting, fluid-pressure engine comprising a cylinder, separated pistons therein, a transverse shaft in split bearings on said cylinder and geared to said pistons, a radial load-operating arm on said shaft, a valve actuator worked by said shaft, the shaft together with said arm and said actuator being separable from the cylinder and from the valve mechanism.

10. A fluid-pressure engine comprising a double-acting cylinder, a piston therein a removable shaft on said cylinder, a gear wheel on the shaft and geared to said piston, a housing for said gear wheel, a radial load-operating arm on said shaft, and valve-operating means also on the said shaft and removable therewith.

11. A double-acting fluid-pressure engine comprising a cylinder, a piston therein, a shaft having a rack and gear connection with the piston, a radial load-operating arm on the shaft, said shaft and arm being separable from the rack and pistons and reversible in relation thereto for different extreme positions of the arm, a valve for the engine operated by the shaft and an adjustable connection between said valve and shaft.

12. A double-acting fluid-pressure engine comprising a cylinder, a piston therein, a shaft having a rack and gear connection with the said piston, a straight radial load-operating arm on the shaft, said shaft and arm being separable from and adjustable in relation to said piston, and a valve and an adjustable operating connection between said valve and the piston, said connection being operative at the end of the stroke of the piston.

13. A double-acting fluid-pressure engine comprising a cylinder, separated pistons therein with an intermediate rack, a transverse shaft mounted in split bearings, a gear on said shaft engaging said rack and removable therefrom, a radial load-operating arm on said shaft, admission and exhaust valves for each end of the cylinder, and an adjustable actuator on said shaft for operating said valves at each end of the engine stroke.

Signed at Albany, county of Albany, and State of New York, this 12th day of October, 1918.

LEE P. HYNES.
JOHN W. CONWAY.